United States Patent [19]
Buckley et al.

[11] Patent Number: 4,883,525
[45] Date of Patent: Nov. 28, 1989

[54] GLASS-CERAMIC SUPPORT FOR FUSING AND SAGGING OPHTHMALMIC MULTIFOCAL LENSES

[75] Inventors: Milford L. Buckley, Horseheads, N.Y.; Harry L. Burke, Harrodsburg, Ky.

[73] Assignee: Corning Incorporated, Corning, N.Y.

[21] Appl. No.: 228,455

[22] Filed: Aug. 5, 1988

[51] Int. Cl.$^4$ ............................................. C03B 11/08
[52] U.S. Cl. ........................................... 65/37; 65/25.4; 65/26; 65/374.13; 29/559; 249/115; 264/2.3; 264/2.5; 427/133; 427/135
[58] Field of Search .................... 249/114.1, 115, 135; 427/133, 135; 65/25.4, 26, 37–39, 374.13; 264/1.1, 1.2, 1.6, 1.7, 2.2, 2.3, 2.4, 2.5; 29/559

[56] References Cited

U.S. PATENT DOCUMENTS

| | | | |
|---|---|---|---|
| 3,141,756 | 7/1964 | Giffen | 65/374.11 X |
| 3,244,497 | 4/1966 | Copeland | 65/26 X |
| 3,266,107 | 8/1966 | Groteke | 427/135 X |
| 3,341,315 | 9/1967 | Patschorke | 65/26 X |

*Primary Examiner*—Robert L. Lindsay
*Attorney, Agent, or Firm*—Clinton S. Janes, Jr.

[57] ABSTRACT

There is disclosed a low expansion glass-ceramic substrate for supporting a glass multifocal lens assembly during a fusing or sagging heat treatment. The substrate has baked on its supporting surface a paint composed essentially of titania, alumina and a mica.

21 Claims, 1 Drawing Sheet

GLASS-CERAMIC SUPPORT FOR FUSING AND SAGGING OPHTHMALMIC MULTIFOCAL LENSES

FIELD OF THE INVENTION

This invention is in the field of glass ophthalmics. It is concerned with a substrate for a multifocal ophthalmic lens assembly, and with a method of supporting such assembly during a heat treatment, such as sagging or fusing the assembly.

BACKGROUND OF THE INVENTION

The traditional glass multifocal lens consists of a major element, usually composed of a crown glass, and a small button or segment, usually composed of a barium or flint glass and fused in the surface of the major. The major element provides far vision correction, while the smaller segment member provides near vision, or reading, correction. Both the structure and the production of this type multifocal lens are described in greater detail in our commonly assigned copending application Ser. No. 116,152 filed Nov. 3, 1987 in the name of M. L. Buckley, and reference is made thereto.

An alternative form of multifocal lens is known as the progressive lens. In this type of lens, the effective convex radii of a meniscus glass blank is progressively decreased by sagging the blank over a support. The curvature of the substrate is thereby imparted through the thickness to the top surface to effect a progressively changing curvature of increasing optical power or decreased focal lengths. This avoids the fusing step of the traditional procedure, but still requires a supported heat treatment for sagging.

Thus, it is necessary to support a blank or lens assembly on a substrate during either a fusion or a sagging heat treatment. In general, such support member should resist distortion at temperatures up to at least 750° C., must take and maintain an optically true surface, be resistant to abrasion, have a low coefficient of thermal expansion and not adhere to the glass being heat treated.

Supports employed heretofore have been primarily bonded ceramics, that is, fired bodies composed of ceramic mixtures. They have included silicon carbide composites, as well as fired mixtures of alumina and chrome oxide, of asbestos and iron oxide, and of chromite and iron oxide. These bodies vary from a very hard, high density body that acts as a heat sink to a very soft, low density body that is insulating in nature.

The latter type tends to wear quickly so that its original, true curve surface may be lost during a heat cycle by glass abrasion. This condition is aggravated where a differential in thermal expansion rate exists between the substrate and the glass being supported. A hard, dense body obviates this problem, but requires excessive time and energy in the heating and cooling cycle to avoid glass breakage due to tensile stresses. Glass sticking has not been a serious problem with standard crown glasses, but has been encountered with the more recently introduced photochromic glasses. Finally, problems of availability and health risk have precluded various materials heretofore used, such as chrome ores and asbestos.

PURPOSES OF THE INVENTION

A primary purpose is to provide an improved supporting substrate for a lens assembly whereby processes of heat treating ophthalmic lens assemblies are rendered more efficient and economical.

Another purpose is to provide such supporting substrate wherein heat transfer, both into and out of the substrate, occurs rapidly.

A further purpose is to provide a substrate that resists abrasion whereby it may be reused several hundred times before resurfacing is required.

Another purpose is to provide a substrate that has a low coefficient of thermal expansion whereby the substrate remains physically stable during a heat treatment and thus retains its configuration so that a supported glass member is not distorted.

A further purpose is to provide a substrate that is more compatible with photochromic lenses than prior substrates.

Another purpose is to provide an improved method of fusing or sagging a glass multifocal lens assembly based on an improved means of supporting the assembly.

SUMMARY OF THE INVENTION

In fulfillment of these and other purposes, our invention resides in a substrate for supporting a multifocal lens assembly during heat treatment comprising a low expansion, glass-ceramic body having an upper surface with a predetermined curvature, having a baked-on coating of a paint composed essentially of titania, alumina and mica, and being capable of withstanding temperatures up to 750° C. In a preferred embodiment, the body is a lithia-alumina-silica glass-ceramic having a coefficient of thermal expansion on the order of $10 \times 10^{-7}/°C.$ or lower.

The invention further resides in a method of supporting a multifocal ophthalmic lens assembly during a heat treatment which comprises providing a low expansion, glass-ceramic body, surfacing the upper surface of the body to a predetermined curvature, applying a coating consisting essentially of titania, alumina and a mica to the upper surface of the body, baking the coating to a hard layer and thereafter mounting the multifocal assembly on said coating surface for heat treatment. The heat treatment may involve either a fusing or a sagging operation.

Prior Literature

U.S. Pat. No. 2,059,767 (Bausch) discloses producing a composite segment member by pressing a segment into a thermally softened carrier glass in a mold. The segment base is coated so that a base layer of the carrier glass may be readily separated.

U.S. Pat. No. 4,120,930 (Lemelson) discloses producing a mold cavity by casting a ceramic or carbon material, applying a metallic first layer and then applying, as a second hard surface, a carbide, nitride, or oxide of tungsten, titanium, boron, silicon, or aluminum.

U.S. Pat. No. 4,199,342 (Mestre et al.) discloses a process of bending a sheet of glass between pre-heated dies which may be covered with a soft refractory sheet material.

U.S. Pat. No. 4,052,184 (Anderson) discloses using glass-ceramic materials for forming softened glass.

DESCRIPTION OF THE INVENTION

Figure 1:
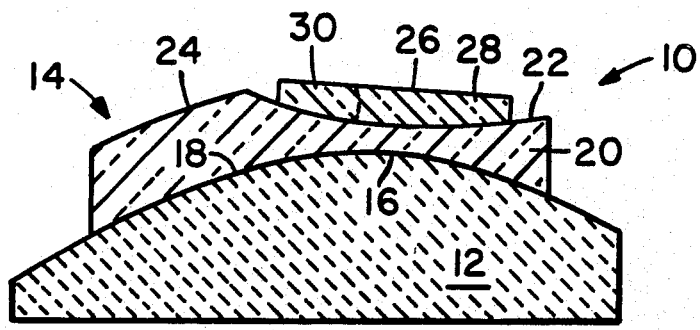
FIG. 1 is a cross-section view of a typical prior art assembly for fusing a glass multifocal lens blank.

FIG. 1 is a vertical cross-section view of a typical fusing assembly 10 such as has been previously used for fusing a multifocal ophthalmic lens assembly 14. Assembly 10 is characterized by a bonded ceramic fusing block 12.

Block 12 is typically composed of a ceramic mix, as earlier described, molded into a rectangular or round solid and fired. An upper face on the fired block is then ground to a desired convex curvature 16. This curvature will correspond to the concave curvature desired on the inside or under face 18 of major element 20 in lens assembly 14.

Lens assembly 14, as shown in FIG. 1, is a typical multifocal lens assembly composed of a major element blank 20 having a countersink 22 formed in its upper surface 24. Mounted in countersink 22 is a composite button or segment member 26 composed of a near vision correcting segment 28, usually a flint glass, and a sealing segment 30 of a glass similar or identical to that of major 20.

Figure 2:
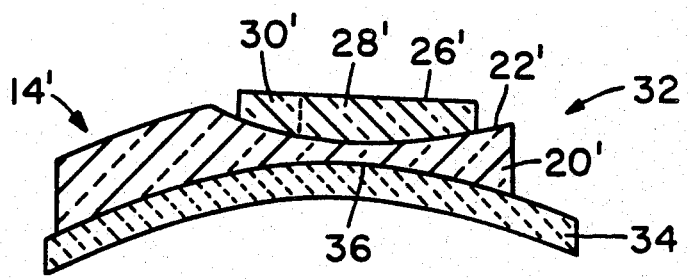
FIG. 2 is a cross-section view of an assembly for fusing a glass multifocal lens blank in accordance with the present invention.

FIG. 2 is a cross-section view of a fusing assembly 32 similar to that of FIG. 1, but illustrating the present invention. Assembly 32 is characterized by a glass-ceramic fusing block 34. Block 34 may be a small sheet or plate of glass molded or sagged to desired curvature, as shown, and then cerammed (crystallized in situ). The upper surface of cerammed block 34 is then conformed to desired curvature 36 as with block 12.

The lens assembly of FIG. 2 may be essentially identical to that of FIG. 1 as indicated by corresponding primed numbers. Thus, the assembly is indicated by 14', the major element by 20', the countersink by 22', the segment member by 26', and segment portions by 28' and 30'.

An alternative heat treating procedure, utilizing the improved supporting substrate of the invention, is a sagging procedure such as used in producing a progressive power, multifocal lens. In preparing such a lens, a meniscus glass lens blank is sagged over a curved surface to impart progressively shorter focal lengths of curvature to the top convex surface through thickness of the lens. Thus, the lens blank is conformed to a desired curvature for intermediate and near vision correction. To this end, the blank may be placed on a supporting block and subjected to a temperature at which the glass softens sufficiently to sag against, and take the net curvature of, the supporting substrate through thickness of the glass member.

Figure 3:
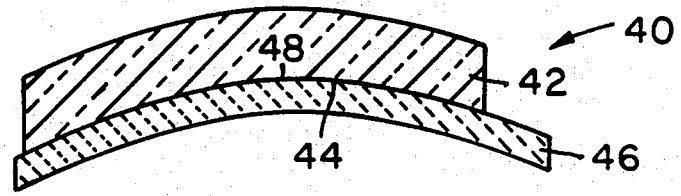
FIG. 3 is a cross-section view of an assembly for sagging a progressive lens in accordance with the invention.

FIG. 3 illustrates an assembly 40 wherein a lens blank 42 has been conformed to the curvature 44 of a glass-ceramic support substrate 46. Lower surface 48 of lens blank 42 may then be ground, as required, to a selected sphere curve for optical measurement of focal lengths.

Glass-ceramics suitable for production of the present support substrates have a low thermal expansion coefficient not over about $15 \times 10^{-7}/°C.$, and preferably on the order of zero expansion. Further, for heat treating purposes, they must withstand temperatures up to at least 750° C. without showing any sign of distortion or deformation.

Lithia-alumina-silica glass-ceramics typically exhibit such low thermal expansion coefficients, and hence are particularly effective for the purpose. This composition family is well known and widely described in the literature, for example U.S. Pat. No. 2,920,971 (Stookey). Two examples, commercially available from Corning Glass Works, Corning, N.Y., under Code Nos. 0336 and 9608, are described in detail in U.S. Pat. No. 4,246,207 (Spycher).

As shown in FIG. 2, the present glass-ceramic substrate has an essentially uniform thickness. Preferably, this is not over about 5 mm. With such a thin substrate having good heat conductivity, the effect of the substrate on heat transfer is essentially negligible. Accordingly, heating and cooling cycle rate is essentially dependent on the lens assembly itself. This has enabled cutting the time of a typical, multifocal blank fusing cycle in half. The high inherent strength of the glass-ceramic materials permits the use of the characteristically thin substrates.

In preparing a glass-ceramic support substrate, a precursor glass blank may be formed to desired curvature by pressing or sagging. The formed blank is then cerammed by a conventional heat treatment. Thereafter, the upper, supporting surface of the substrate is surfaced, as by diamond grinding or lapping, to a desired curvature.

The surfaced substrate now has a coating of ceramic paint applied to its upper surface and baked on. Successive applications may be applied and baked on; two or three layers having been found preferable.

It has been found that a glass lens assembly tends to stick to a glass-ceramic surface during a heat treatment at temperatures of 650°–750° C. The reason for this is not known, but ion exchange between the glass and the glass-ceramic is considered a possibility. This occasioned search for a paint or coating that would inhibit the sticking tendency.

We have found that a paint containing finely ground alumina and a micaeous material as a base, and titania as an additive, is unusually effective in preventing sticking. The presence of titania has been found critical for the purpose, and up to about 10% may be present. Greater titania contents tend to migrate. This creates haze problems, particularly with photochromic glasses. Accordingly, we prefer a paint containing 4–5% titania for photochromic lens supports and 7–10% for white crown lens supports.

The solids are finely ground to provide a smooth surface when baked. They are suspended in a volatile vehicle to provide a paint that is applied to the substrate surface, preferably by spraying. After each application, the paint is baked, for example, at about 630° C. for a half hour. Such paints are available from Sperex Corporation, 16131 Maple Avenue, Gardenia, Calif. 90248 under the designation VHT series SP-100.

Where a photochromic glass that has a basic borosilicate composition is being supported, we have obtained optimum results using a low titania content paint. Typical paints are supplied under designations SP-110 and SP-117. These paints are composed of about 45% by weight of silicone resin, about 8% metallic oxide pigments (4.3% titania, 1% alumina and 2.7% mica), about 16% silicate extenders and the balance aromatic solvents. We prefer to apply a primer coat followed by two overcoats with baking after each application.

With non-photochromic optical glasses, e.g. alkali-lime-silicate or alkali-zinc-silicate type base compositions known as, respectively, ophthalmic white and tinted crown glasses, paints having a higher titania content are preferred. Typical paints are supplied under designations SP-101, SP-102 and SP-Flat. The compositions of these paints are similar to those described above, except that the metallic oxide content is about 10% and the titania content is 7 to 8%. With these paints, we apply three regular coats (no primer) and bake after each application.

We have found that the glass-ceramic supporting substrate provides a number of distinct advantages over prior bonded ceramic blocks. The ability to shorten a heat treating cycle, due to faster heating and cooling rates, has already been described. This is facilitated by thermal transfer at both surfaces of the glass being heated. The arch construction of FIG. 2, in contrast to the solid body of FIG. 1, is a significant factor.

The glass-ceramic substrate is highly resistant to both mechanical and thermal shock. This both prolongs useful life and avoids loss of lenses in production. The ability to employ a low expansion material is also valuable in avoiding development of stresses in the lens assembly during heating and cooling.

Of particular value is the hard, durable nature of the baked on coating and its adherence to the glass-ceramic surface. Not only does this provide a clean operation free from dusting, but the substrate may be repeatedly reused. Thus, in a test run in a lens fusion operation, a set of supports was reused more than a thousand times before the surfaces needed to be reground to remove all of the original coating and recoated for further use.

Finally, the new support has been found to minimize the sticking problems encountered with photochromic crown glasses. Thereby, better control of the fusion cycle, and hence photochromic properties, becomes possible.

We claim:

1. A substrate for supporting a multifocal lens assembly during heat treatment comprising a low expansion glass ceramic body having an upper surface with a predetermined curvature, having a baked-on coating of a paint in which the solids are composed essentially of titania, alumina and a mica and being capable of withstanding temperatures up to 750° C.

2. A substrate in accordance with claim 1 wherein the glass-ceramic body has a coefficient of thermal expansion not over about $15 \times 10^{-7}/°C$.

3. A substrate in accordance with claim 2 wherein the glass-ceramic is a lithia-alumina-silica type.

4. a substrate in accordance with claim 1 wherein the predetermined curvature of the upper surface is convex and corresponds to a desired concave surface on the multifocal lens assembly to be supported thereon.

5. A substrate in accordance with claim 1 wherein the paint has an alumina-mica base and contains titania in an amount not over about 15% by weight.

6. A substrate in accordance with claim 1 having an essentially uniform thickness.

7. A substrate in accordance with claim 6 wherein the thickness is not over about 5 mm.

8. A method of supporting a multifocal ophthalmic lens assembly during a heat treatment which comprises providing a low expansion glass-ceramic body, surfacing the upper surface of the body to a predetermined curvature, applying a coating of a titania-alumina-mica paint to the upper surface, baking the coating, said coating being capable of withstanding temperature up to 750° C. and thereafter mounting the multifocal assembly on said coated surface for heat treatment.

9. A method in accordance with claim 8 wherein the assembly is a progressive multifocal lens and the heat treatment comprises sagging the lens to conform with the upper surface of the supporting body.

10. A method in accordance with claim 8 wherein the assembly comprises a major element having a countersink within which a segment is to be sealed and the heat treatment comprises fusing the segment to the major element.

11. A method in accordance with claim 8 wherein the upper surface of the glass-ceramic body is surfaced by diamond grinding.

12. A method in accordance with claim 8 wherein the upper surface of the glass-ceramic body is surfaced by lapping.

13. A method in accordance with claim 8 wherein the predetermined curvature of the upper surface is convex and corresponds to the concave surface machined on the lens assembly.

14. A method in accordance with claim 8 wherein the glass-ceramic body has a coefficient of thermal expansion not over about $15 \times 10^{-7}/°C$.

15. A method in accordance with claim 8 wherein the titania-alumina-mica, baked-on coating contains not over about 15% titania.

16. A method of heat treating a multifocal ophthalmic lens assembly which comprises providing a low expansion glass-ceramic body, surfacing the upper surface of the body to a predetermined curvature, applying a coating of a titania-alumina-mica paint to the upper surface, baking the coating said coating being capable of withstanding temperatures up to 750° C., and thereafter mounting the multifocal assembly on said coated surface for heat treatment and subjecting said assembly to an elevated temperature for a predetermined time.

17. A method in accordance with claim 16 wherein the assembly is a progressive multifocal lens and the heat treatment comprises sagging the lens to conform with the upper surface of the body.

18. A method in accordance with claim 16 wherein the assembly comprises a major element having a countersink within which a segment is to be sealed and the heat treatment comprises fusing the segment to the major element.

19. A method in accordance with claim 16 wherein the elevated temperature is on the order of 650° C.–750° C.

20. A substrate in accordance with claim 1 wherein up to about 10% of the paint, as applied, consists of the solids titania, alumina and mica, the total content of these three solids taken as 100%, consists of at least about 50% titania, and at least 10% each of alumina and mica.

21. A method in accordance with claim 8 wherein up to about 10% of the coating of paint applied consists of the solids titania, alumina and mica, the total content of these three solids taken as 100%, consists of at least about 50% titania, and at least 10% each of alumina and mica.

* * * * *